United States Patent Office 3,362,216
Patented Jan. 9, 1968

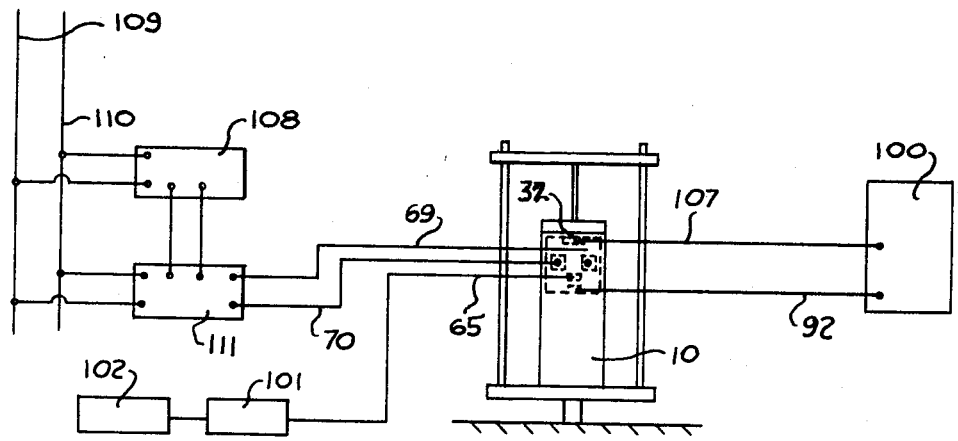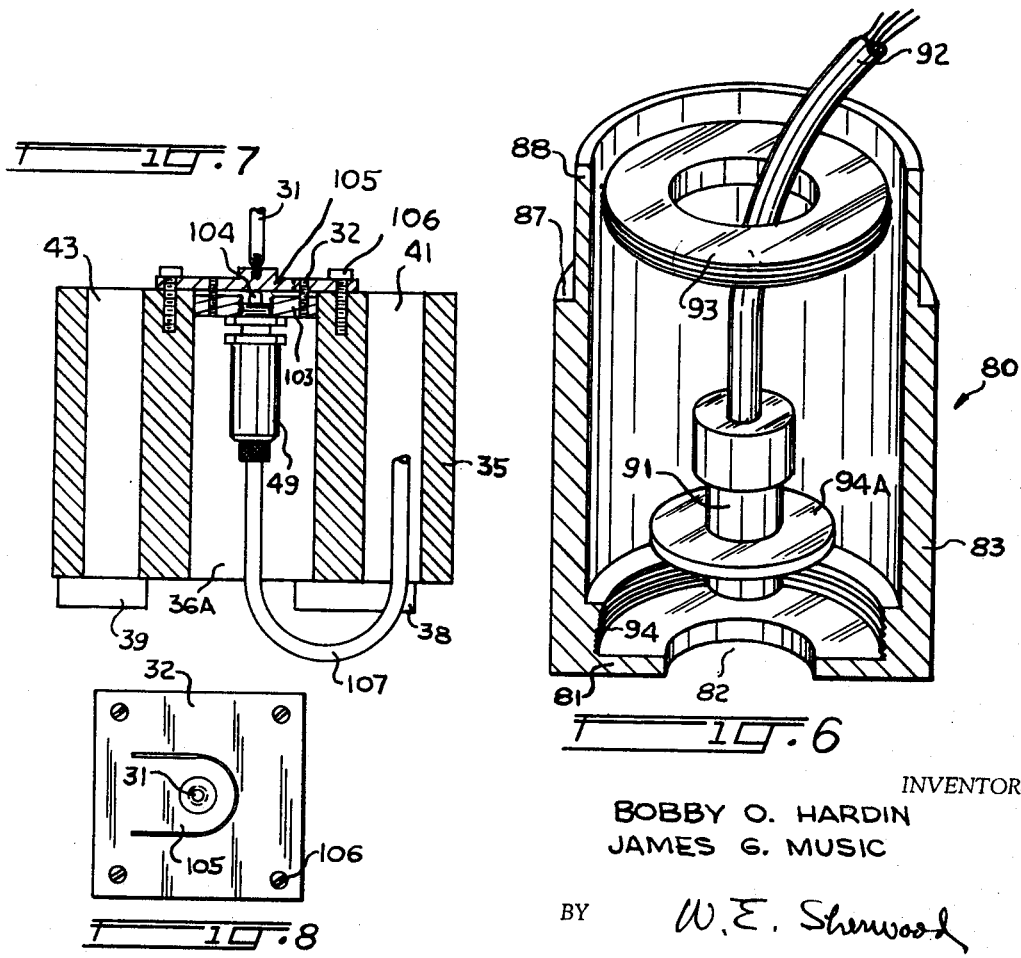

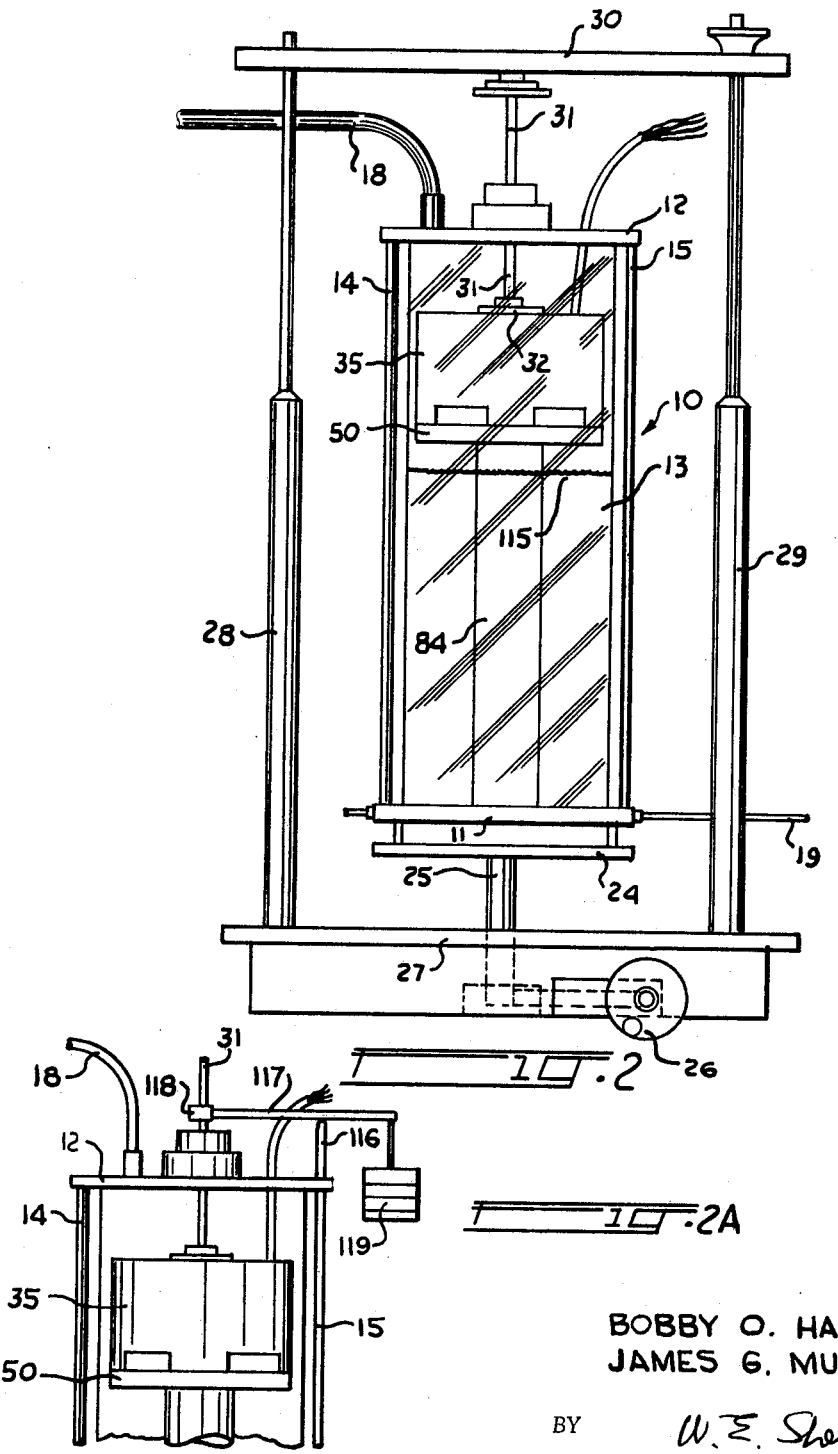

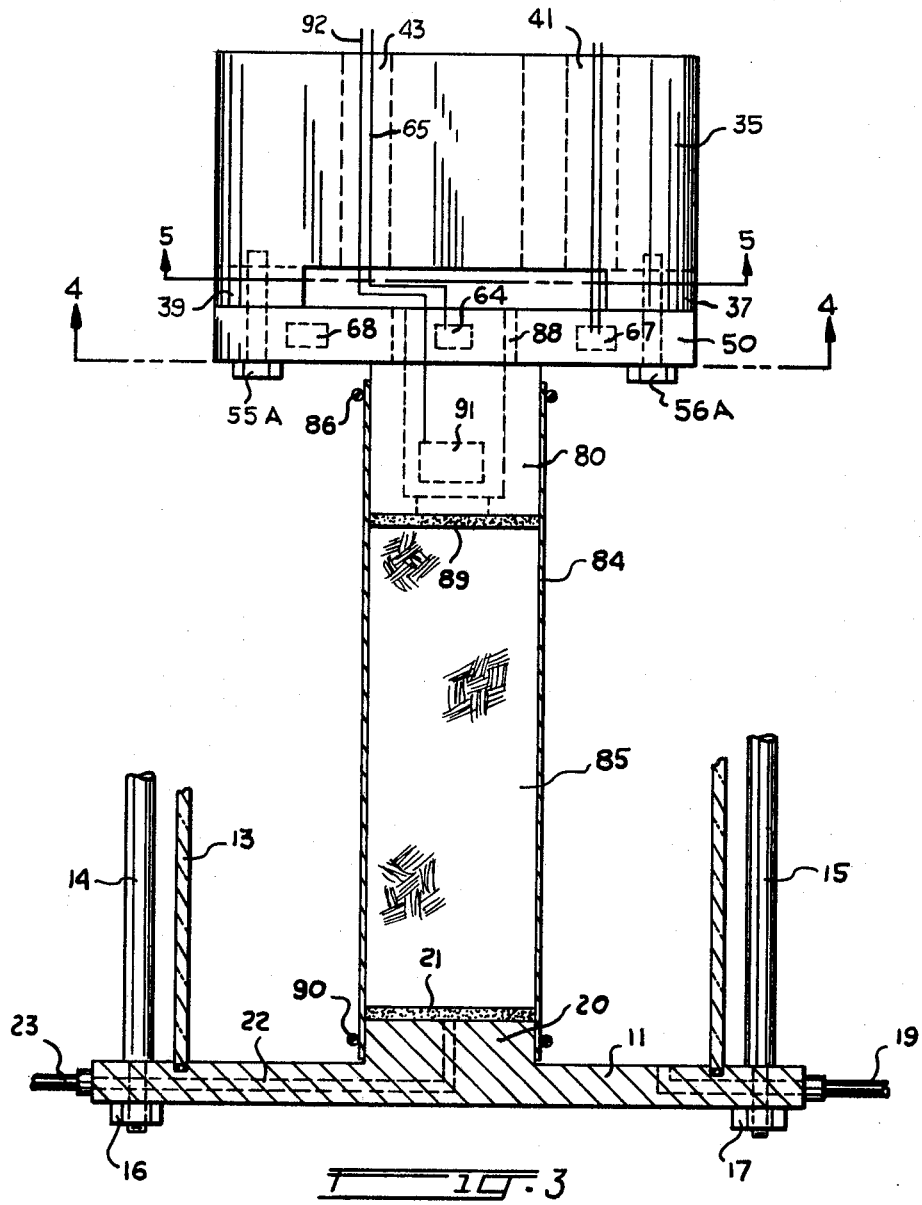

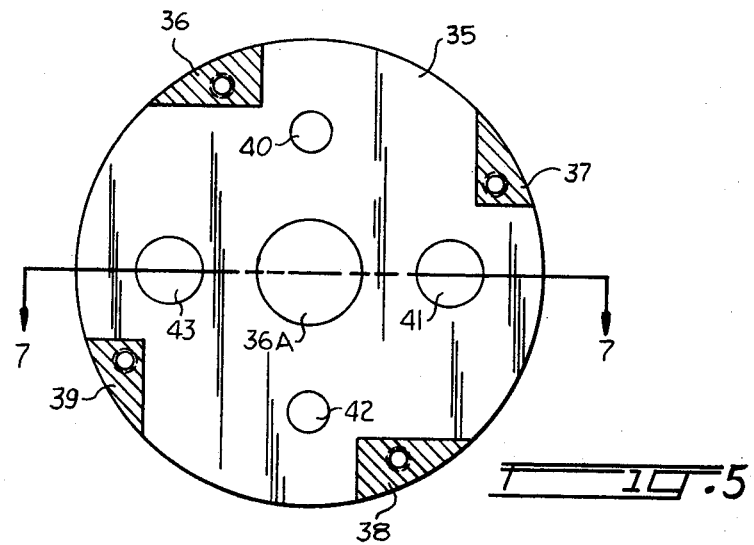
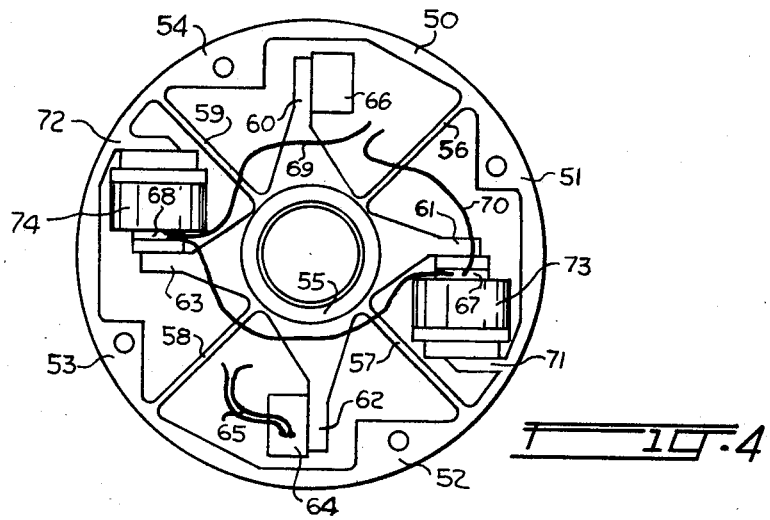

3,362,216
APPARATUS FOR TESTING EFFECTS OF TORSIONAL VIBRATION
Bobby O. Hardin and James G. Music, Lexington, Ky., assignors, by mesne assignments, to The University of Kentucky Research Foundation, Lexington, Ky., a corporation of Kentucky
Filed Aug. 11, 1965, Ser. No. 478,964
5 Claims. (Cl. 73—94)

ABSTRACT OF THE DISCLOSURE

Apparatus for applying torsional vibration to rod-like specimens of soil whose strength and whose pore water pressure are to be tested. The specimen can be subjected simultaneously to compression and to torsional stress, and the apparatus employed is suitable for carrying out tri-axial testing of the soil specimen.

---

This invention relates generally to the testing of the strength of materials, and more particularly to apparatus for applying torsional vibration to rod-like specimens of material during the conduct of such testing.

In accordance with the invention the apparatus may be employed for a variety of tests upon such specimens. Moreover, while the apparatus is especially suited for testing specimens of soil or the like, it may in its broader aspects, be used for testing specimens of coherent materials such as metal, wood, plastic or the like. Effects of vibration on various soil properties, for example, which are conventionally determined by the tri-axial test, can be studied when using the apparatus of our invention. As an illustration, it is well suited for determining the shear modulus or shear wave velocity, and for studying the damping or energy dissipative characteristics of soils.

An object of the invention is to provide an improved apparatus for applying torsional vibration to specimens of material being tested.

Another object is to provide an apparatus for applying simultaneously a torsional vibration and a stress directed axially of the specimen being tested.

Another object is to provide an apparatus for testing rod-like specimens of soil subjected to torsional vibration and to axial compression stresses and wherein the pore water pressure, or the axial load, or both, may be measured.

Other objects and advantages will become more apparent as the description proceeds and when considered in conjunction with the accompanying drawings in which:

FIG. 1 is a diagrammatic view indicating the relationship of suitable electrical equipment with respect to the mechanical portions of the apparatus.

FIG. 2 is an assembly view of one form of apparatus employing the invention in conjunction with a tri-axial test chamber.

FIG. 2A is a view of a portion of the apparatus shown in FIG. 2 modified to balance the weight of the apparatus applied to the specimen.

FIG. 3 is an assembly view, to a larger scale and partly in section, showing the loading member in attached relation to a specimen, the axial load cell being omitted and portions only of the chamber being indicated.

FIG. 4 is a bottom plan view of the second portion of the loading member taken on line 4—4 of FIG. 3.

FIG. 5 is a sectional view taken on line 5—5 of FIG. 3.

FIG. 6 is a view partly in section and to a larger scale of the cap and with the transducer shown in disassembled form.

FIG. 7 is a sectional view taken on line 7—7 of FIG. 5 and with the axial load cell in place on the first portion of the loading member, and FIG. 8 is a top plan view of the axial load cell detached from the loading member.

Referring first to FIG. 2, the invention is shown in conjunction with a conventional chamber indicated generally at 10 and in which the well-known triaxial test is usually carried out. In its broader aspects, however, the invention is not limited to use with such a chamber. Essentially, the chamber comprises a bottom plate 11 and a top plate 12 between which a tubular transparent wall 13 is securely held by tie rods, such as 14, 15. The chamber wall is suitably sealed at its end to the top and bottom plates, when a test is taking place and the tie rods are provided with suitable means, such as nuts 16, 17, for disassembling the chamber when the tested specimen is to be removed and a new one is to be inserted. The upper plate has a flexible conduit 18 extending therefrom and connected to a source of gas pressure, and the lower plate has a flexible conduit 19 fitted thereto and communicating with the interior of the chamber. Conduit 19 is adapted to supply and to remove water as required during a test and is provided with conventional valve means, not shown.

Centrally located in the bottom plate is a flat-top abutment 20 (FIG. 3) adapted to be covered by a porous, rigid disc 21, and forming a first abutment for supporting one end of the specimen in frictional contact therewith. A passageway 22 extends interiorly of the lower plate and communicates with a flexible conduit 23 controlled by a valve means and serving to discharge liquid extracted from the specimen during the test. The chamber as a whole is detachably supported upon a base plate 24 (FIG. 2) suitably spaced from the lower plate 11, and a lift rod 25 is attached to the base plate and is adapted to be raised and lowered by any suitable means, such as a hand-operated gearing indicated generally at 26.

The lift rod is slidably mounted in a suitable rigid foundation member 27 to which a pair of upright supports 28, 29 are rigidly attached, these supports carrying an adjustable cross brace 30 adjacent their upper ends. Depending from the cross brace and detachably affixed thereto is a rigid support rod 31 which extends in sealed relation through the top plate 12 of the chamber and attaches to the load cell plate 32 shown in FIGS. 7 and 8 and later to be described.

For use with the above-described tri-axial test chamber, the invention provides a mechanism, herein called a loading member, for insertion within the chamber and for applying various forms of stress loadings to the specimen. This loading member includes a relatively massive cylindrical first portion, or block, 35 having a diameter slightly less than that of the cylinder wall 13 and with a central opening 36A extending therethrough for mounting of an axial load cell, as indicated in FIG. 7. The upper end of portion 35 is flat and the lower end is provided with a series of depending legs 36, 37, 38 and 39 serving to space the first portion of the loading member from the second portion, as now to be described. The spacing thus afforded provides for locating of the several electrical wires leading from the loading member and which pass through a plurality of holes 40, 41, 42 and 43 in the first portion of the loading member and extend from the top thereof and thence in sealed relation through the top plate 12 of the chamber.

As a significant feature of the invention, we provide as the second portion of the loading member the mechanism as best shown in FIG. 4 and including an outer ring 50 having inwardly projecting bosses 51, 52, 53, and 54. These bosses preferably match the size and location of the legs on the first portion 35 of the loading member and by means of suitable fastenings, such as seen as 55A, 56A, the two parts of the loading member are rigidly joined together. A center ring concentric with the outer ring and having a downwardly facing annular shoulder 55 also forms part of the second portion of the loading member. Symmetrically and radially spaced around the center ring are thin strips 56, 57, 58 and 59 joined at their ends to the respective rings and serving as leaf springs which are stiff when subjected to loading axially of the rings but which are flexible when subjected to torsion about that axis.

Projecting radially and symmetrically from the center ring intermediate adjacent strips is a series of cantilever arms 60, 61, 62, and 63. At the end of arm 62 an accelerometer 64 having conductors 65 leading therefrom is rigidly attached and partakes of the movement of the inner ring. Such accelerometer may conveniently comprise the model 200–2 type available from Columbia Research Laboratories, Woodlyn, Pa. At the end of the arm 60 diametrically opposite the accelerometer a counter-balancing weight 66 is attached.

To the ends of arms 61 and 63 a pair of tubular electrical coils 67 and 68 are rigidly attached and these coils are joined in series by a conductor 69 and by a return conductor 70 forming part of the electrical system best shown in FIG. 1. Attached to the inner periphery of the outer ring 50 is a pair of brackets 71 and 72 supporting a pair of tubular cylindrical permanent magnets 73 and 74, respectively, and with which the respective coils 67 and 68 are adapted to cooperate. The arrangement of the magnets and coils is such that upon passage of current the forces produced by the coils make a mechanical couple. Moreover, when a voltage is applied to the coils a torque is generated upon the center ring and thus if a sinusoidally varying voltage is being applied to the coils, a sinusoidally varying force is produced.

Referring now to FIGS. 3 and 6, we provide for use with the above-described loading member a hollow cap, serving as a second abutment for the specimen, generally designated 80 and having a flat bottom plate 81 of substantial thickness and with a circular opening 82 therethrough. The cylindral wall 83 of the cap extends a substantial distance axially of the cap and provides an outer surface against which a flexible sheath 84 enclosing a rod-like specimen 85 of soil or the like may be secured as by means of a resilient band 86 (FIG. 3). The wall of the cap is offset inwardly adjacent its top by means of a ledge 87 and the extreme upper end of the cap is provided with a narrow wall 88 having a diameter suitable for insertion within the opening of the inner ring of the loading member. Set screws or the like, not shown, may be employed to join the cap rigidly to that inner ring when the ledge 87 is brought into contact with the annular shoulder 55 of the inner ring. A porous rigid disc 89 also is interposed between the upper end of the specimen and the bottom 81 of the cap. As will now be apparent, the lower end of the cap and the interposed disc 89 provides a second abutment against which the specimen 85 is positioned in frictional contact during a test. This second abutment is adapted to supply a vibratory torsional movement to the upper end of that specimen. The lower end of the specimen is enclosed by sheath 84 which by means of a resilient band 90 is held against the side of the lower abutment 20.

One of the tests frequently required of soil specimens is that of pore water pressure and for that purpose the present invention provides a transducer such as model 4–312 available from Consolidated Electrodynamics of Monrovia, Calif. and generally shown in FIG. 6. This transducer 91 includes wiring 92 leading therefrom and passing through a threaded mounting ring 93 engageable with threads 94 in the inner surface of the wall 83 of the cap 80. Upon tightening of ring 93 the collar 94A of the transducer is held against the bottom wall 81 of the cap and prevents water which is extracted from the specimen during the test from excaping into the interior of that cap. This water then collects in the space within opening 82 of the cap and above the porous disc 89 and the transducer 91 accordingly sends an output signal which is representative of the pore water pressure. As generally shown in FIG. 3, the wiring from the transducer 91 passes through an open space in the second portion of the loading member and thence through hole 43 in the first portion of the loading member and after passing in sealed relation through the top plate of the chamber, is connected to a conventional recorder 100 (FIG. 1). In similar manner the wires 65 from the accelerometer 64 are led from the chamber and connected to a cathode follower 101 which in turn is connected to oscilloscope 102.

A significant test required of a soil specimen involves its behavior under axial loading, and which loading may be either compression or tension. For the purpose of securing this information the present apparatus embodies in conjunction with the load cell plate 32 a universal transducing cell 49 which may be the Statham UC 3 type. This cell assembly includes a square mounting plate having an annular lower portion 103 shaped to fit in the opening 36A of the loading member and into which lower portion the universal transducing cell 49 is mounted with its contact member 104 projecting upwardly. The mounting plate embodies a lanced flap portion 105 which flexes under load and to which the suport rod 31 for the loading member is rigidly attached. Suitable fastenings such as screws 106 fix the mounting plate to the top face of the loading member and the lower portion 103 is affixed to the square mounting plate and in spaced relation thereto by any suitable fastening means. Leading from the transducer 49 and directed through hole 41 of the loading member and in sealed relation through the top plate 12 of the chamber are output conductors 107 connected to the recorder 100.

A conventional oscillator 108 deriving its energy from power lines 109, 110 feeds into a conventional power amplifier 111 which in turn is connected to conductors 69 and 70 leading to the above described coils in the second portion of the loading member.

Having thus described one form of apparatus in which the invention may be embodied, the flexibility of use and practical advantages of that apparatus will now be apparent to those skilled in the art and when considered with respect to the illustrative uses now to be described.

Assuming that a specimen 85 of soil encased in the sheath 84 is to be tested in the chamber as shown in FIG. 2, a body of water is directed into the chamber from conduit 19 until it reaches the desired level 115 after which communication with the water source may be interrupted by any suitable valve, not shown. Any suitable super-atmospheric pressure may be applied to the chamber through conduit 18 by supplying a gaseous fluid, it being noted that gas and not water is in contact with the electrical components housed in the chamber. If a compression loading axially of the specimen is to be employed, movement of lift rod 25 upwardly will effect such loading, and since support rod 31 for the loading member is attached to and reacts against the fixed cross brace 30 such compression loading will be transmitted to the load cell plate 32 and its associated universal transducing cell 49.

Frequently, before beginning a test on such a specimen it is desirable to prevent or control anisotropic consolidation of the material. As seen in FIG. 2A the apparatus of the present invention may accomplish this by provision of a projection 116 on tie rod 15 of the chamber and upon which a lever 117 is fulcrumed. By temporarily detaching lift rod 31 from cross brace 30 and by attaching one end of the lever to such rod as by a clamp 118 and with a weight 119 suspended from the other end of the lever, all or any selected part of the weight of the apparatus can be removed from the specimen. Of course, the lever and weight arrangement can also be employed even while an axial compression is taking place and with the lift rod 31 in fixed position as seen in FIG. 2, if such an arrangement is desired.

In either event, the application of torsional vibration testing may be carried out independently of, or simultaneously with, the application of stresses axially of the specimen.

With the oscillator 108 set to produce the predetermined amplitude and the predetermined frequency of vibration needed for the test, a sinusoidally varying voltage is applied to coils 67 and 68 in the second portion of the loading member. These coils then move with respect to the permanent magnets 73, 74 with which they are magnetically linked and a sinusoidally varying force is produced upon that portion of the loading member which transmits vibration to the specimen. In this connection, the following significant details may be noted.

The permanent magnets while reacting to the magnetic field established by the coils are substantially prevented from moving because of their attachment to the outer ring 50 of the second portion of the loading member and because that ring itself is rigidly attached to the massive first portion 35 of the loading member which has a relatively large rotational inertia. By contrast, the rotational inertia of the center ring and the parts attached thereto, including the cap 80, is relatively small. The resulting sinusoidally varying torque produced upon these parts of small inertia gives rise to an efficient torsional vibration of those parts and with a restoring force being established in each of the spring-like strips when that torque moves those parts. The strips, moreover, can withstand stress axially of the loading member and specimen, and without interference with their functioning during torsional vibration. Thus, for purposes of analysis, the apparatus, without a specimen being in place, is essentially a single degree of freedom system since the center ring and attached parts are relatively rigid and the strips 56, 57, 58 and 59 are relatively weightless. The specimen itself is characterized by distributed mass and properties and has many degrees of freedom, although the base of the specimen resting upon the abutment 20 is to be considered fixed to the chamber which has large rotational inertia.

When the coils 67 and 68 are energized the specimen is subjected to torsional vibration and the accelerometer 64 gives an output signal representative of that vibration and showing the amplitude of vibration. At the same time, the loading upon the specimen in its axial direction is measured by the axial load cell 32. Furthermore, when it is desired to measure the water pore pressure of the specimen the transducer 91 measures the same even while the torsional vibration is taking place, it being understood that the sheath 84 prevents water in the specimen from escaping except into recess 82 of the cap and through conduit 23. During measurement of pore water pressure, escape of water through conduit 23 normally is blocked by a suitable valve.

The apparatus is adapted also for super imposing and measuring tension stresses upon the specimen in conjunction with the application of the tri-axial cell pressure and torsional vibration. One way of accomplishing this is to leave the support rod 31 attached and to permit the lift rod 25 to settle downwardly as the specimen elongates.

In the event that a measurement of elongation or contraction of the specimen is desired, any suitable means, not shown, such as a displacement gage, may be connected between a movable part of the assembly such as tie rod 15 and a stationary part of the assembly such as frame upright 29, the output from such a gage being fed to recorder 100. A gage suitable for this purpose is illustrated by model 585–DT–100 available from Sanborn Company, Waltham, Mass.

As will be understood, the invention may be employed for torsional vibration testing without use of the tri-axial test chamber as when a fluid-backing pressure upon the specimen is not required. In such a situation the specimen, which normally will be of relatively coherent material, rests upon the first abutment 20 at one end and upon the cap 80 at its other end and is exposed to the atmosphere. In such a test the specimen may be attached to the abutments by clamps or by a suitable adhesive.

The above testing arrangements are illustrative of the various tests which may be conducted and are not to be considered as limiting the apparatus solely to such testing usages.

Having thus described the invention and its attendant capabilities, it is intended that the appended claims are to cover such changes and modifications of the described apparatus as fall within the true spirit and scope of the invention.

What is claimed is:

1. Apparatus for testing effects of torsional vibration upon rod-like specimens of soil comprising, vertically disposed first and second abutments axially adjustable relative to each other and adapted to support the specimen therebetween by frictional contact with the respective ends of the specimen, means for holding said first abutment against rotation about its axis during the conduct of a test, means for imparting torsional vibration to said second abutment about its axis and thence to the specimen in contact with said second abutment during conduct of a test, means contained within said second abutment for simultaneously measuring the pore water pressure of said specimen during the torsional vibration, and means for adjusting the position of said first abutment axially of the specimen thereby to place an axially directed compression stress upon the specimen supplementing the torsional vibration stress applied thereto by said second abutment.

2. Apparatus for testing effects of torsional vibration upon rod-like specimens of soil comprising, vertically disposed first and second abutments axially adjustable relative to each other and adapted to support the specimen therebetween, means for holding said first abutment against rotation about its axis during the conduct of a test; a loading member including a first portion of relatively large rotational inertia and substantially fixed with respect to said specimen, a second portion of relatively small rotational inertia, and flexible means, joining said first and second portions; said second portion mounting said second abutment and including a detachable cap engageable at one end with said second portion of said loading member and engageable at its other end with one end of said specimen, said cap being hollow and having an aperture at its lower end to receive water from said specimen, a transducer in said cap adapted to measure the pressure of said water and means for imparting torsional vibration to said second portion of said loading member and thereby to said cap and to the specimen in contact therewith.

3. Apparatus as defined in claim 2 wherein said means for imparting torsional vibration includes a magnet and coil assembly mounted upon said loading member, and means for supplying a sinusoidally varying voltage to said coil.

4. In an apparatus for testing effects of torsional vibration vertically disposed upon rod-like specimens of soil, a loading member for applying torsional stress at the upper end of the specimen and including a relatively massive block, an outer generally circular ring rigidly attached to one face of the block, an inner generally circular ring concentric with said outer ring, a plurality of radially arranged narrow strips joining said inner and outer rings, said strips being deformable clockwise and counterclockwise in planes normal to the axis of said rings and being substantially non-deformable in planes containing the axis of said rings, means for applying a compression stress to said specimen along the axis of said rings, a cap attached to said inner ring and adapted to support the end of the specimen which is to receive torsional vibration said cap being hollow and having an aperture at its lower end to receive water from said specimen, a transducer in said cap adapted to measure the pressure of said water, an arm attached to said inner ring, a magnet-and-coil unit interposed between said arm and said outer ring, one element of said unit being rigidly attached to said arm and the complementary element of said unit being rigidly attached to said outer ring, and means for supplying a sinusoidally varying voltage to said coil thereby to cause said inner ring and cap to twist about the axis of said inner ring when current is flowing in one direction in said coil and to establish a restoring force in said strips serving to rotate said inner ring and cap in the reverse direction when current is flowing in the opposite direction in said coil.

5. Apparatus as defined in claim 4 including a second arm attached to said inner ring and an accelerometer mounted upon said second arm and adapted to signal the amplitude of vibration of said inner ring and said cap.

References Cited

UNITED STATES PATENTS

| | | | |
|---|---|---|---|
| 1,831,320 | 11/1931 | Pertz | 73—99 |
| 2,356,894 | 8/1944 | Sims | 73—99 X |
| 2,871,693 | 2/1959 | Navratil et al. | 73—1 |
| 2,922,901 | 1/1960 | Wewgel | 310—36 X |
| 3,039,395 | 6/1962 | Chausson | 310—36 X |
| 3,106,653 | 10/1963 | Fowler | 73—7.16 X |
| 3,113,463 | 12/1963 | Holt | 73—505 |
| 3,127,765 | 4/1964 | O'Neil | 73—101 X |
| 3,277,700 | 10/1966 | Myerholtz | 73—99 |

FOREIGN PATENTS

| | | |
|---|---|---|
| 283,787 | 1/1928 | Great Britain. |
| 400,957 | 11/1933 | Great Britain. |

RICHARD C. QUEISSER, *Primary Examiner.*

JAMES J. GILL, *Examiner.*

J. H. WILLIAMSON, *Assistant Examiner.*